(12) United States Patent
Torii

(10) Patent No.: US 8,764,299 B2
(45) Date of Patent: Jul. 1, 2014

(54) WHEEL BEARING APPARATUS INCORPORATED WITH A ROTATIONAL SPEED DETECTING APPARATUS

(75) Inventor: Akira Torii, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/438,860

(22) Filed: Apr. 4, 2012

(65) Prior Publication Data

US 2012/0189234 A1 Jul. 26, 2012

Related U.S. Application Data

(63) Continuation of application No. PCT/JP2010/067388, filed on Oct. 4, 2010.

(30) Foreign Application Priority Data

Oct. 5, 2009 (JP) ................................ 2009-231355

(51) Int. Cl.
*F16C 32/00* (2006.01)
*F16C 13/00* (2006.01)

(52) U.S. Cl.
USPC .......................................... 384/448; 384/544

(58) Field of Classification Search
USPC .................. 384/448, 544, 589; 324/173, 174, 324/207.22, 207.55
See application file for complete search history.

(56) References Cited

U.S. PATENT DOCUMENTS

| | | | |
|---|---|---|---|
| 7,374,344 B2* | 5/2008 | Shigeoka et al. | 384/448 |
| 2006/0002644 A1* | 1/2006 | Mitsue et al. | 384/448 |
| 2006/0228062 A1* | 10/2006 | Nagata et al. | 384/448 |
| 2010/0124389 A1 | 5/2010 | Norimatsu et al. | |

FOREIGN PATENT DOCUMENTS

| | | |
|---|---|---|
| CN | 101688878 | 3/2010 |
| DE | 11 2008 001 279 | 4/2010 |
| JP | 2-075961 | 3/1990 |
| JP | 08-178939 | 7/1996 |
| JP | 2007-120560 | 5/2007 |
| JP | 2008-196645 | 8/2008 |
| JP | 2008-286265 | 11/2008 |
| JP | 2008-286266 | 11/2008 |
| JP | 2008-286267 | 11/2008 |
| JP | 2008-286268 | 11/2008 |
| JP | 2008-286269 | 11/2008 |
| JP | 2008-303899 | 12/2008 |
| JP | 2009-002385 | 1/2009 |
| JP | 2009-149121 | 7/2009 |
| WO | WO2007/049602 | 5/2007 |
| WO | WO2008/139739 | 11/2008 |

* cited by examiner

*Primary Examiner* — James Pilkington
(74) *Attorney, Agent, or Firm* — Harness, Dickey & Pierce, P.L.C.

(57) ABSTRACT

A wheel bearing apparatus incorporating a rotational speed detecting apparatus has an axially extending through bore formed in a mounting portion. A bottomed cylindrical sensor receptacle is integrally molded with the through bore. The sensor receptacle is press-formed from a non-magnetic steel sheet. The bottom portion of the sensor receptacle is arranged to oppose the pulser ring via a predetermined axial gap.

10 Claims, 8 Drawing Sheets

WHEEL BEARING APPARATUS INCORPORATED WITH A ROTATIONAL SPEED DETECTING APPARATUS

CROSS-REFERENCE TO RELATED APPLICATIONS

This application is a continuation of International Application No. PCT/JP2010/067388, filed Oct. 4, 2010, which claims priority to Japanese Application No. 2009-231355, filed Oct. 5, 2009. The disclosures of the above applications are incorporating herein by reference.

FIELD

The present disclosure generally relates to a vehicle wheel bearing apparatus that rotatably supports a wheel of a vehicle, such as an automobile, with respect to a suspension apparatus. More particularly, it rotates to a wheel bearing apparatus incorporating a rotational speed detecting apparatus to detect wheel speed of the vehicle and is intended to improve the scalability of the wheel bearing.

BACKGROUND

A wheel bearing apparatus is generally known that can support a wheel of vehicle with respect to a suspension apparatus and incorporating a rotational speed detecting apparatus to detect a rotation speed of a wheel of a vehicle to control the anti-lock braking system (ABS). In such a bearing apparatus, a sealing apparatus is arranged between inner and outer members that rotate relatively to each other, via rolling elements contained between them. The sealing apparatus is integrally formed with a magnetic encoder with magnetic poles alternately arranged along its circumference. The rotational speed detecting apparatus includes the magnetic encoder and a rotational speed sensor to detect the change of the magnetic poles of the magnetic encoder caused by the rotation of the wheel of the vehicle.

A rotational speed sensor is generally known that is adapted to be mounted on a knuckle that forms part of a suspension apparatus, after the wheel bearing apparatus has been mounted on the knuckle. A wheel bearing apparatus incorporating a rotational speed detecting apparatus has been proposed that can avoid the troublesome air gap adjustment between the rotational speed sensor and the magnetic encoder. Also, it contains the rotational speed sensor in the wheel bearing to reduce the size of the wheel bearing apparatus.

A known structure of a wheel bearing apparatus incorporating a rotational speed detecting apparatus is shown in FIG. 10. This wheel bearing apparatus includes an outer member 51, forming a stator member and adapted to be secured to a knuckle (not shown), and an inner member 52. The inner member 52 is arranged in the outer member 51 via double row balls 53, 53. The inner member 52 includes a wheel hub 55 and an inner ring 56 fit onto the wheel hub 55.

The outer member 51 has an integrally formed body mounting flange 51b on its outer circumference. The outer member inner circumference includes double row outer raceway surfaces 51a, 51a. The inner member 52 is formed with double row inner raceway surfaces 55a, 56a. The inner raceway surfaces 55a, 56a oppose the double row outer raceway surfaces 51a, 51a of the outer member 51. One inner raceway surface 55a of the double row inner raceway surfaces 55a, 56a is formed on the outer circumference of the wheel hub 55. The other inner raceway surface 56a is formed on the outer circumference of the inner ring 56. The inner ring 56 is press-fit onto the cylindrical portion 55b that axially extends from the inner raceway surface 55a of the wheel hub 55. The double row balls 53, 53 are contained between the outer and inner raceway surfaces and are rollably held herein by cages 57, 57.

The wheel hub 55 is integrally formed with a wheel mounting flange 54, for mounting a wheel (not shown), on one end. The inner ring 56 is axially immovably secured by a caulked portion 58. The caulked portion 58 is formed by plastically deforming the end of the cylindrical portion 55b. A seal 59 and a sensor cap 63 are mounted on the ends of the outer member 51. The seal 59 and sensor cap 63 prevent leakage of lubricating grease sealed within the bearing and entry of rain water or dust from the outside of the bearing.

A magnetic encoder 60 is press-fit onto the outer circumference of the inner ring 56. The magnetic encoder 60 includes an annular supporting member 61. The supporting member 61 has a substantially L-shaped cross-section. An encoder body 62 is adhered to the side of the annular supporting member 61. The encoder body 62 has N and S poles alternately arranged along its circumference.

The sensor cap 63 is fit into the inner circumference of the inner-side end of the outer member 51 to close the opening of the outer member 51. The sensor cap 63 includes a bottomed cylindrical cap body 64, formed by injection molding synthetic resin, and an annular metallic member 65. The annular metallic member 65 is press-formed from a steel sheet to have an annular configuration with a substantially L-shaped cross-section. The metallic member 65 is integrated with the cap body 64 during injection molding of the cap body 64.

An axially projected portion 66 is formed on the cap body 64 at a radially outer portion. A sensor receiving bore 67 is formed in the projected portion 66 at a position corresponding to the magnetic encoder 60. As shown in FIG. 11, a sleeve 68 is fit into the sensor receiving bore 67. A sensor 69 is further inserted into the sleeve 68, via an O-ring 70. The sensor 69 includes an IC circuit incorporated with a magnetic detecting element 71. It senses changing characteristics in accordance with the direction of flux such as a Hall element, a magnetic resistance element (MR element) etc. A waveform shaping circuit, for shaping the output waveform of the magnetic detecting element 71, is included. It forms the ABS of an automobile to detect the rotational speed of a wheel and to control it.

A mounting portion 72 projects from the sensor 69. The mounting portion 72 has a bolt inserting aperture 73. A sleeve 74 is fit in the aperture 73. The sensor 69 can be mounted on the cap body 64 by screwing a sensor securing bolt 75, inserted into the sleeve 74, into an inserted nut 76.

The cap body 64 and the sensor 69 are formed of low water absorption plastic materials such as PA (polyamide) 612, PPS (polyphenylene sulfide) etc. Thus, dimension variations and the generation of cracks, that would be otherwise caused by absorption of the sensor mounting member, can be prevented. The sealability can also be maintained (see Japanese Laid-open Patent Publication No. 2007-120560).

A prior art wheel bearing apparatus incorporating a rotational speed detecting apparatus has the sensor 69 inserted into the sensor receiving bore 67 formed in the projected portion 66 of the cap body 64, via the O-ring 70. The O-ring 70 would be bit between the sensor receiving bore 67 and the sensor 69. Thus, it would be damaged during insertion of the sensor 69. In addition, it is believed that the sensor 69 would be urged to its eccentric position in the sensor receiving bore 67 when the sensor securing bolt 75 is screwed into the inserted nut 76. Thus, the interference of the O-ring 70 would be uneven and the sealability would be extremely detracted. Accordingly, muddy water would enter into the wheel bearing through the sensor receiving bore 67.

Furthermore, the sensor receiving bore 67 of the cap body 64 is kept exposed until the sensor 69 is inserted into the sensor receiving bore 67 during assembly by an automobile manufacturer. Thus, some foreign matter would be led into the wheel bearing through the sensor receiving bore 67. Accordingly, it is necessary to close the sensor receiving bore 67 by using any type of sealing member, such as a plug, before assembling the sensor 69 into the wheel bearing apparatus.

SUMMARY

It is, therefore, an object of the present disclosure to provide a wheel bearing apparatus incorporating a rotational speed detecting apparatus that can solve the problems of prior art described above. Thus, the present device improves the workability during assembly of the wheel bearing apparatus as well as assuring its sealability.

To achieve the above mentioned object, a wheel bearing apparatus incorporating a rotational speed detecting apparatus comprises an outer member integrally formed with double row outer raceway surfaces on its inner circumference. An inner member includes a wheel hub and at least one inner ring. The wheel hub is integrally formed on its one end with a wheel mounting flange. A cylindrical portion axially extends from the wheel mounting flange. The inner ring is press fit onto the cylindrical portion of the wheel hub. The inner member is formed on its outer circumference with double row inner raceway surfaces. The inner raceway surfaces oppose the double row outer raceway surfaces. Double row rolling elements are contained between the outer raceway surfaces and inner raceway surfaces of the outer member and the inner member. A pulser ring is adapted to be fit onto the outer circumference of the inner ring and secured to it. The pulser ring has a magnetic characteristic that alternately and equidistantly varies along its circumferential direction. A bottomed cylindrical sensor cap is formed from synthetic resin by injection molding. The sensor cap is fit onto the inner-side end of the outer member. A mounting portion, formed on the sensor cap, axially projects from the sensor cap at a radial outer position. A sensor unit is mounted on the mounting portion at a position corresponding to the pulser ring. A rotational speed sensor is embedded in the sensor unit and is arranged opposite to the pulser ring, via a predetermined axial air gap. An axially extending through bore is formed in the mounting portion. A bottomed cylindrical sensor receptacle is integrally molded with the through bore. The sensor receptacle is press-formed from a non-magnetic steel sheet. The bottom portion of the sensor receptacle is arranged opposite to the pulser ring via a predetermined axial gap.

The wheel bearing apparatus incorporating a rotational speed detecting apparatus includes a pulser ring adapted to be fit onto the outer circumference of the inner ring and secured to it. The pulser ring has a magnetic characteristic that alternately and equidistantly varies along its circumferential direction. A bottomed cylindrical sensor cap is formed from synthetic resin by injection molding and fit onto the inner-side end of the outer member. A mounting portion, formed on the sensor cap, axially projects from the sensor cap at a radially outer position. A sensor unit is mounted on the mounting portion at a position corresponding to the pulser ring. A rotational speed sensor, embedded in the sensor unit, is arranged opposite to the pulser ring, via a predetermined axial air gap. An axially extending through bore is formed in the mounting portion. A bottomed cylindrical sensor receptacle is integrally molded with the through bore. The sensor receptacle is press-formed of a non-magnetic steel sheet. The bottom portion of the sensor receptacle is arranged opposite to the pulser ring via a predetermined axial gap. Thus, it is possible to perform a highly accurate speed detection without any adverse affect on the sensing performance of the rotational speed sensor. A desirable air gap may be obtained by only inserting the sensor unit into the sensor receptacle until the sensor unit abuts against the bottom of the sensor receptacle. Accordingly, this improves the workability of assembly while eliminating complicated air gap adjustment. In addition, the inside of the bearing can be perfectly sealed off by the bottomed sensor receptacle from the outside. Thus, it is possible to provide a wheel bearing apparatus incorporating a rotational speed detecting apparatus that can assure sealability without providing any sealing mechanism, such as an O-ring, between the sensor receptacle and the sensor unit.

The sensor unit has a sensor holder with an integrally formed inserting portion, where the rotational speed sensor is embedded, and an integrally formed mounting flange adapted to be secured to the mounting portion of the sensor cap. A nut is embedded in the mounting portion of the sensor cap by insert molding. A sensor holder of the sensor unit can be detachably secured to the mounting portion of the sensor cap via a securing bolt. This enables the sensor unit to be surely secured without causing a positioning shift for a long term.

The sensor receptacle is formed with a flange portion extending radially outward at the open end of its cylindrical portion. The sensor receptacle is formed with an overlap-bent portion extending radially outward from its cylindrical portion. The sensor receptacle has a first cylindrical portion of smaller diameter axially extending from its bottom portion. A second cylindrical portion, of larger diameter, is continuous with the first cylindrical portion of smaller diameter, via an overlap-bent portion. The overlap-bent portion extends radially outward from the first cylindrical portion of smaller diameter. This enables the sensor receptacle to be firmly secured to the sensor cap.

The mounting portion is formed with the through bore where the sensor unit is mounted. The cylindrical portion of the sensor receptacle is embedded in the mounting portion, without exposure to the outside. This increases the contacting area between the mounting portion of the sensor cap and the sensor receptacle. Thus, this further firmly secures the sensor receptacle.

The sensor receptacle is molded in the through bore so that the bottom portion of the sensor receptacle projects toward the pulser ring from the bottom surface of the sensor cap. This makes it possible to set a desirable axial gap between the pulser ring and the sensor receptacle without any influence of interference between the sensor cap and the wheel bearing.

The thickness of a metal sheet forming the sensor receptacle is set within a range of 0.2-1.0 mm. This exactly forms the configuration of the cylindrical portion of the sensor receptacle and thus enables a desirable magnetic characteristic.

The sensor cap includes a bottomed cap body and a metal core integrally molded with the cap body at its open end. The metal core is exposed to the outer circumference of the cap body. The metal core is adapted to contact the outer member when the sensor cap is press-fit into the inner circumference of the outer member. This increases the strength and rigidity of the sensor cap and also improves the sealability of the fitting portion due to its metal-to-metal fitting contact.

The metal core is press-formed from a non-magnetic steel sheet. This makes it possible to perform highly accurate speed detection without any adverse affect.

A through aperture, with a small diameter having a spherical cross-section, is formed in the bottom portion of the sensor cap at the outer-side end face of the nut. A sealing member, such as a rubber ball, is press-fit into the through aperture. This prevents rain water etc. from entering into the inside of the wheel bearing from the outside even if a gap is formed in the joining portion between the embedded nut, by insert molding, and the nut.

The wheel bearing apparatus incorporating a rotational speed detecting apparatus comprises an outer member integrally formed with double row outer raceway surfaces on its inner circumference. An inner member includes a wheel hub and at least one inner ring. The wheel hub is integrally formed on its one end with a wheel mounting flange. A cylindrical portion axially extends from the wheel mounting flange. The inner ring is press fit onto the cylindrical portion of the wheel hub. The inner member outer circumference includes double row inner raceway surfaces positioned opposite to the double row outer raceway surfaces. Double row rolling elements are contained between the outer raceway surfaces and inner raceway surfaces of the outer member and the inner member. A pulser ring is adapted to be fit onto the outer circumference of the inner ring and secured to it. The pulser ring has a magnetic characteristic alternately and equidistantly varying along its circumferential direction. A bottomed cylindrical sensor cap is formed from synthetic resin by injection molding. The sensor cap is fit onto the inner-side end of the outer member. A mounting portion, formed on the sensor cap, axially projects from the sensor cap at a radially outer position. A sensor unit is mounted on the mounting portion at a position corresponding to the pulser ring. A rotational speed sensor, embedded in the sensor unit, is arranged opposite to the pulser ring, via a predetermined axial air gap. An axially extending through bore is formed in the mounting portion. A bottomed cylindrical sensor receptacle is integrally molded with the through bore. The sensor receptacle is press-formed from a non-magnetic steel sheet. The bottom portion of the sensor receptacle is arranged opposite to the pulser ring, via a predetermined axial gap. Thus, it is possible to perform a highly accurate speed detection without any adverse affect to the sensing performance of the rotational speed sensor. A desirable air gap is obtained by only inserting the sensor unit into the sensor receptacle until the sensor unit abuts against the bottom of the sensor receptacle. Accordingly, this improves the workability of assembly while eliminating the complicated air gap adjustment. In addition, the inside of the bearing can be perfectly sealed off by the bottomed sensor receptacle from the outside. Thus, it is possible to provide a wheel bearing apparatus incorporating a rotational speed detecting apparatus that assures sealability without providing any sealing mechanism, such as an O-ring, between the sensor receptacle and the sensor unit. Thus, the sensor receptacle is not exposed to the outside.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A wheel bearing apparatus incorporating a rotational speed detecting apparatus includes an outer member with an integrally formed body mounting flange on its outer circumference. The flange is to be mounted on a knuckle. The outer member inner circumference includes double row outer raceway surfaces. An inner member includes a wheel hub and at least one inner ring. The wheel hub is integrally formed on its one end with a wheel mounting flange. A cylindrical portion axially extends from the wheel mounting flange. The inner ring is press fit onto the cylindrical portion of the wheel hub. The inner member outer circumference includes double row inner raceway surfaces opposing the double row outer raceway surfaces. Double row rolling elements are contained between the outer raceway surfaces and inner raceway surfaces of the outer member and the inner member. A pulser ring is adapted to be fit onto the outer circumference of the inner ring and secured to it. The pulser ring has a magnetic characteristic that alternately and equidistantly varies along its circumferential direction. A bottomed cylindrical sensor cap, formed from synthetic resin by injection molding, is fit onto the inner-side end of the outer member. A mounting portion, formed on the sensor cap, axially projects from the sensor cap at a radially outer position. A sensor unit is mounted on the mounting portion at a position corresponding to the pulser ring. A rotational speed sensor, embedded in the sensor unit, is arranged opposite to the pulser ring, via a predetermined axial air gap. The sensor cap includes a bottomed cap body and a metal core integrally molded with the cap body at its open end. An axially extending through bore is formed in the mounting portion. A bottomed cylindrical sensor receptacle is integrally molded with the through bore. The sensor receptacle is press-formed from a non-magnetic steel sheet. The bottom portion of the sensor receptacle is arranged opposite to the pulser ring, via a predetermined axial gap.

Preferred embodiments of the present disclosure will be described with reference to the accompanied drawings.

Figure 1:
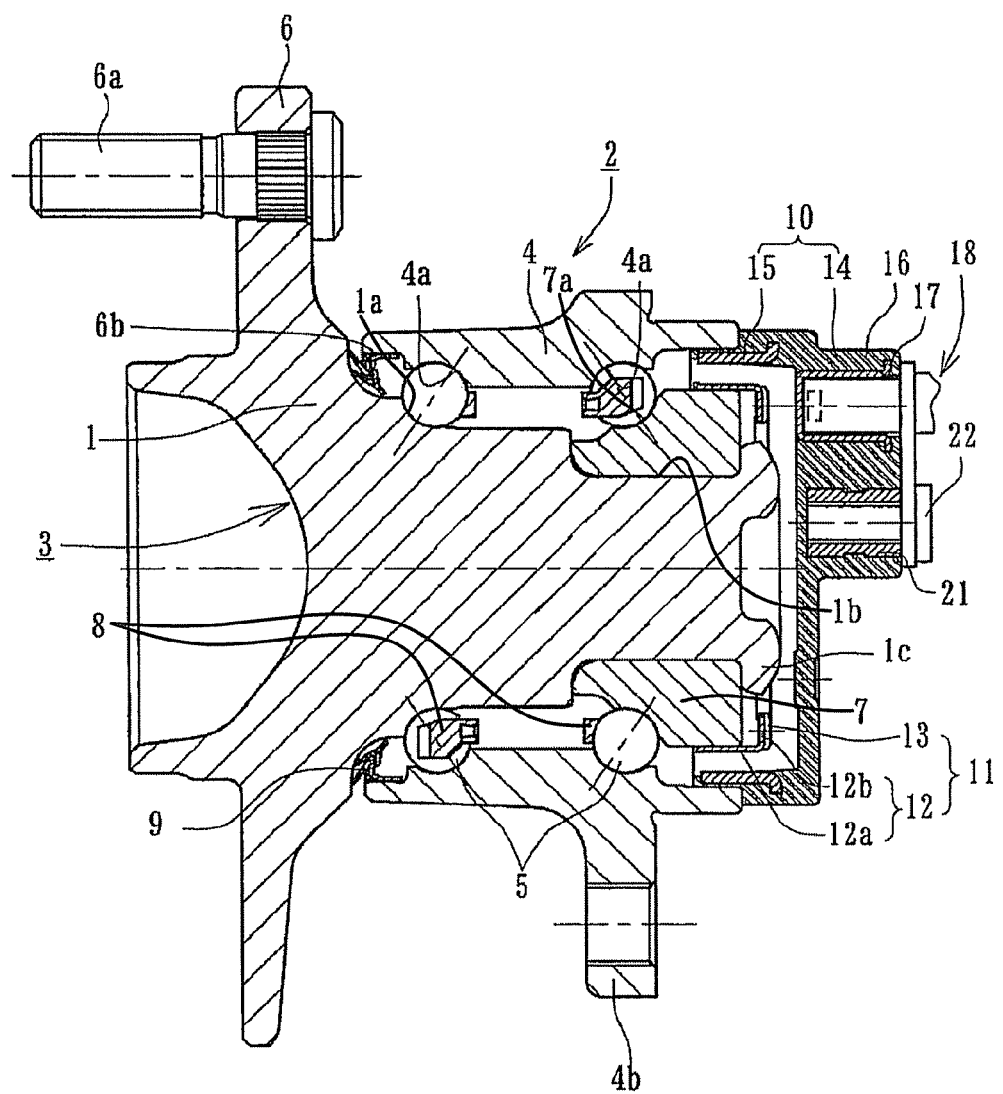
FIG. 1 is a longitudinal-section view of a first embodiment of a wheel bearing apparatus incorporating a rotational speed detecting apparatus.
Figure 2:
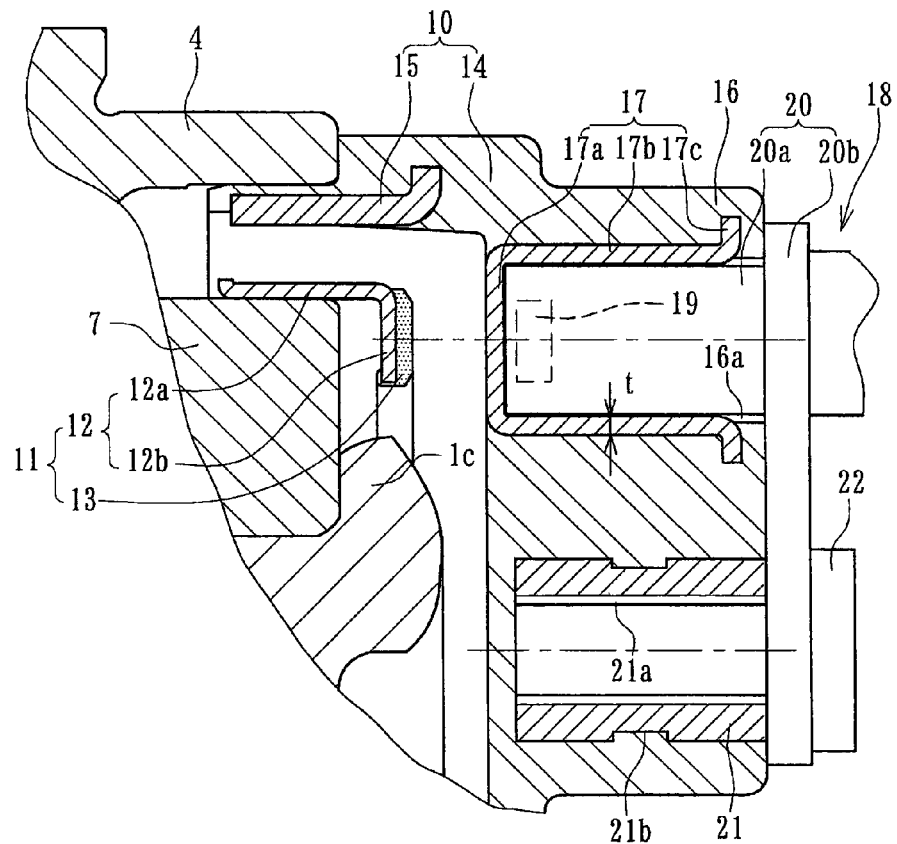
FIG. 2 is a partially enlarged view of FIG. 1.
Figure 3:
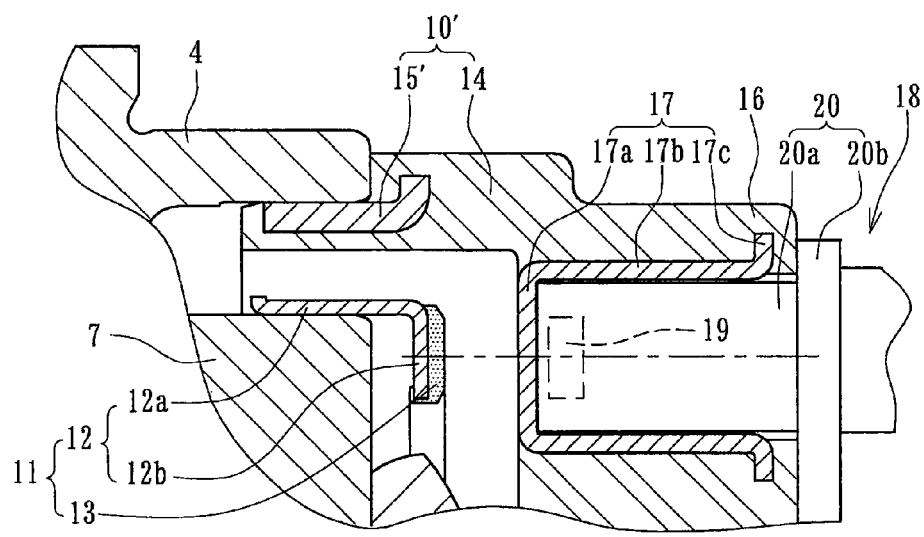
FIG. 3 is a partially enlarged view of a modification of FIG. 2.

FIG. 1 is a longitudinal-section view of a first embodiment of a wheel bearing apparatus incorporating a rotational speed detecting apparatus. FIG. 2 is a partially enlarged view of FIG. 1. FIG. 3 is a partially enlarged view of a modification of FIG. 2. FIGS. 4-7 are partially enlarged views of other modifications of FIG. 2. In the description below, an outer-side of a bearing apparatus when it is mounted on a vehicle is referred to as the "outer-side" (left side in FIG. 1). An inner-side of a bearing apparatus when it is mounted on a vehicle is referred to as the "inner side" (right side in FIG. 1).

The wheel bearing apparatus incorporating a rotational speed detecting apparatus is of a so-called "third generation" type for a driven wheel. It includes a wheel hub 1 and a double row rolling bearing 2, formed as a unit. The double row rolling bearing 2 includes an inner member 3, an outer member 4, and double row rolling elements (balls) 5, 5 contained between the inner and outer members 3 and 4. The inner member 3 includes the wheel hub 1 and an inner ring 7 press-fit onto the wheel hub 1.

The wheel hub 1 is integrally formed, on its outer-side end, with a wheel mounting flange 6 to mount a wheel (not shown). Hub bolts 6a are secured on the wheel mounting flange 6 at circumferentially equidistant positions. In addition, the wheel hub 1 is formed, on its outer circumference, with one (outer-side) inner raceway surface 1a. A cylindrical portion 1b axially extends from the inner raceway surface 1a. The inner ring 7 is press-fit on the cylindrical portion, via a predetermined interference. The inner ring 7 is axially secured on the wheel hub 1, with an applied pre-bearing pressure, by a caulked portion 1c. The caulked portion 1c is formed by plastically deforming the end of the cylindrical portion 1c radially outward. An inner-side inner raceway surface 7a is formed on the outer circumference of the inner ring 7.

The outer member 4 is integrally formed, on its outer circumference, with a body mounting flange 4b. The flange 4b is adapted to be mounted on a knuckle (not shown). The outer member inner circumference includes double row outer raceway surfaces 4a, 4a that oppose the double row inner raceway surfaces 7a, 7a of the inner member 3. The double row rolling bearing 2 has double row rolling elements 5, 5 contained between both the raceway surfaces 4a, 1a and 4a and 7a. Cages 8 rollably hold the rolling elements 5, 5 equidistantly along the circumference.

A seal 9 and a sensor cap 10 are mounted on ends of the outer member 4. The seal 9 and sensor cap 10 seal annular openings formed between the outer member 4 and the inner member 3. The seal 9 and the sensor cap 10 prevent leakage of lubricating grease sealed within the bearing and entry of rain water or dust from the outside into the bearing.

The wheel hub 1 is made of medium-high carbon steel such as S53C including carbon of 0.40-0.80% by weight. It is hardened by high frequency induction hardening to have a surface hardness of 58-64 HRC over a region including the inner raceway surface 1a, from a base 6b of the wheel mounting flange 6 forming a seal land of the seal 9, to the cylindrical portion 1b. The caulked portion 1c is not hardened and kept as is after forging to have a hardness below 30 HRC.

Similarly to the wheel hub 1, the outer member 4 is made of medium-high carbon steel such as S53C including carbon of 0.40-0.80% by weight. At least the double row outer raceway surfaces 4a, 4a are hardened by high frequency induction quenching to have a surface hardness of 58-64 HRC. The inner ring 7 and the rolling elements 5 are formed of high carbon chrome steel such as SUJ2 and dip hardened to their cores to have a hardness of 58-64 HRC. Although shown as a double row angular contact ball bearing using balls as the rolling elements 5, 5, the present disclosure is not limited to such. A bearing may be applied to a double row tapered roller bearing using tapered rollers as the rolling elements. In addition, although shown as a third generation type bearing, the present disclosure can be applied to a second generation type bearing where a pair of inner rings is press-fit onto the wheel hub.

A pulser ring 11 is press-fit onto the outer circumference of the inner ring 7. The pulser ring 11 includes an annular supporting member 12 and a magnetic encoder 13. The magnetic encoder 13 is adhered to one side of the annular supporting member 12, by vulcanizing adhesion. The magnetic encoder 13 is formed from an elastomer, such as rubber, which includes mingled ferritic magnetic powder so that N and S poles are alternately arranged along its circumference to form a rotary encoder to detect the rotational speed of a wheel.

The annular supporting member 12 is formed of a steel plate such as ferritic stainless steel sheet (JIS SUS 430 etc.) or preserved cold rolled sheet (JIS SPCC etc.). It is pressed into a substantially L-shaped cross-section. It has a cylindrical portion 12a fit onto the inner ring 7. It also includes a standing plate portion 12b that extends radially inward from the cylindrical portion 12a. The magnetic encoder 13 is adhered to the inner-side surface of the standing plate portion 12b.

A sensor cap 10 is adapted to be fit into the inner circumference of the inner side end of the outer member 4 and secured to it to close an opening of the outer member. The sensor cap 10 includes a bottomed cylindrical cap body 14 formed by injection molding of synthetic resin. A metal core 15 is integrally molded into an opening of the cap body 14. The metal core 15 is formed as an annular member with a substantially L-shaped cross-section. It is formed by press-forming a stainless steel sheet, with corrosion resistance, or a preserved cold rolled sheet (JIS SPCC etc.). In particular, it is preferable that the metal core 15 is formed of non-magnetic steel sheet such as austenitic stainless steel sheet (JIS SUS 304 etc.).

As shown in the enlarged view of FIG. 2, a mounting portion 16 axially projects from a radially outer portion of the cap body 14 of the sensor cap 10. An axially extending through bore 16a is formed in the mounting portion 16 at a position corresponding to the magnetic encoder 13 of the pulser ring 11. A bottomed cylindrical sensor receptacle 17 is integrally molded with the through bore 16a. The sensor receptacle 17 includes a bottom portion 17a, a cylindrical portion 17b and a flange portion 17c. The bottom portion 17a is adapted to be arranged so that it opposes the magnetic encoder 13, via a predetermined axial gap (air gap). The cylindrical portion 17b axially extends from the bottom portion 17a. The flange portion 17c extends radially outward at the open end of its cylindrical portion 17b. The flange portion 17c contributes to firmly secure the sensor receptacle 17 to the cap body 14.

The sensor receptacle 17 is press-formed of non-magnetic steel sheet e.g. austenitic stainless steel sheet (JIS SUS 304 etc.). This makes it possible to perform highly accurate speed detection without causing any adverse affect on a rotational speed sensor 19, as described later. In addition, it is possible to perform a highly accurate speed detection without any adverse affect and to obtain a desirable air gap only by inserting the sensor unit 18 into the sensor receptacle 17 until the sensor unit 18 abuts against the bottom portion 17a of the sensor receptacle 17. Accordingly, this improves the workability of assembly while eliminating the complicated air gap adjustment. Furthermore, the inside of the bearing can be perfectly sealed off from the outside by the bottomed sensor receptacle 17. Thus, it is possible to provide a wheel bearing apparatus incorporating a rotational speed detecting apparatus that assures sealability without providing any sealing mechanism, such as an O-ring, between the sensor receptacle 17 and the sensor unit 18.

The thickness "t" of a metal sheet forming the sensor receptacle 17 is set within a range of 0.2-1.0 mm, preferably 0.4-0.8 mm. If the thickness "t" is less than 0.2 mm, it is difficult to exactly form the configuration of the cylindrical portion 17b of the sensor receptacle 17. If it exceeds 1.0 mm, the air gap will become too large to obtain desirable magnetic characteristics and thus detract from the detecting accuracy.

The sensor unit 18 includes a rotational speed sensor 19 including a magnetic detecting element, such as a Hall element, a magnetic resistance element (MR element), etc. The magnetic detecting element changes characteristics in accordance with the flowing direction of magnetic flux. An IC is incorporated with a waveform shaping circuit to shape the output waveform of the magnetic detecting element. These form the ABS of an automobile to detect the rotational speed of a wheel and to control it.

The rotational speed sensor 19 is embedded in a sensor holder 20. The sensor holder 20 is integrally formed with an inserting portion 20a and a mounting flange 20b. In addition, a nut 21, formed with a female thread 21a on its inner circumference, is embedded in the mounting portion 16 of the cap body 14. The sensor unit 18 is secured to the mounting portion 16 by fastening a securing bolt 22 through the mounting flange 20b. An annular groove 21b, formed on the outer circumference of the nut 21, can prevent an axial movement of the nut 21.

FIG. 3 shows a modification of that shown in FIG. 2. This modification is basically only different from the first embodiment (FIG. 2) in the structure of the sensor cap. Thus, its detailed description will be omitted and the same reference numerals are used to designate the same structural element.

A sensor cap 10' is adapted to be fit into the inner-side end of the outer member 4 to close its opening. This sensor cap 10' includes the bottomed cylindrical cap body 14 formed by injection molding of synthetic resin. A metal core 15' is integrally molded with the cap body 14 at its opening. The metal core 15' is formed as an annular member with a substantially L-shaped cross-section. It is formed by press-forming a stainless steel sheet with corrosion resistance. The sheet is a non-magnetic steel sheet, such as austenitic stainless steel sheet (JIS SUS 304 etc.). The metal core is integrally molded with the cap body 14 so that it is exposed on the outer circumference of the cap body 14. The sensor cap 10' is press-fit into the inner-side end inner circumference of the outer member 4 via metal-to-metal contact fitting between the metal core 15' and the outer member 4. This makes it possible to increase the strength and rigidity of the sensor cap 10'. Also, this improves the sealability of the fitting portion.

Figure 4:
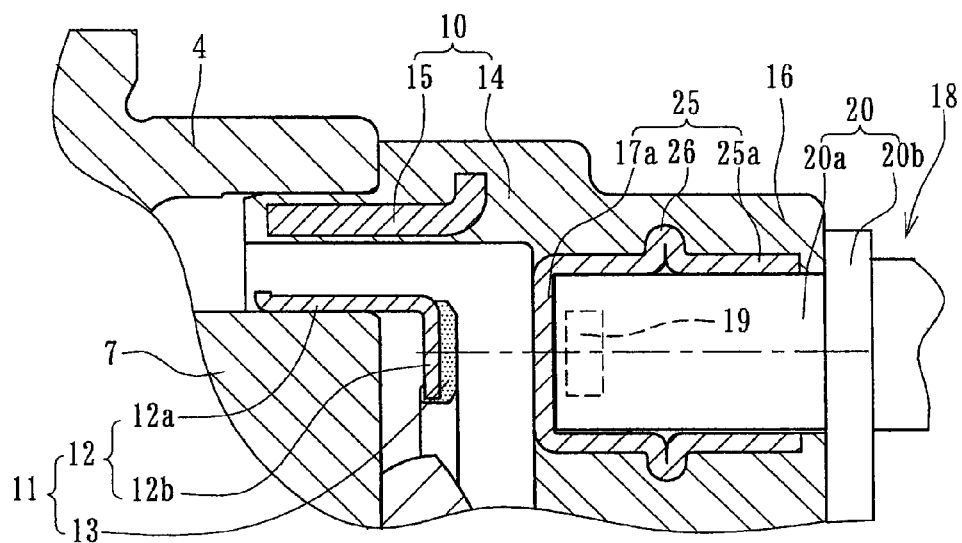
FIG. 4 is a partially enlarged view of another modification of FIG. 2.

FIG. 4 shows another modification of that shown in FIG. 2. This modification is basically only different from the first embodiment (FIG. 2) in the configuration of the sensor receptacle. Thus, its detailed description will be omitted and the same reference numerals are used to designate the same structural element.

The axially projected mounting portion 16 is integrally formed with the cap body 14 at a radially outer portion. A bottomed cylindrical sensor receptacle 25 is integrally molded with the mounting portion 16 at a position corresponding to the magnetic encoder 13. The sensor receptacle 25 includes the bottom portion 17a, a cylindrical portion 25a and an overlap-bent portion 26. The bottom portion 17a is adapted to be arranged so that it opposes the magnetic encoder 13, via a predetermined axial gap. The cylindrical portion 25a axially extends from the bottom portion 17a. The overlap-bent portion 26 is formed on the cylindrical portion 25a so that it extends radially outward substantially at its axially middle position. This makes it possible to further firmly secure the sensor receptacle 25 to the cap body 14.

The sensor receptacle 25 is press-formed of non-magnetic steel sheet, such as austenitic stainless steel sheet (JIS SUS 304 etc.). Similar to the previously described embodiment, this makes it possible to perform highly accurate speed detection without giving any adverse affect to the sensing performance of the rotational speed sensor 19.

Figure 5:
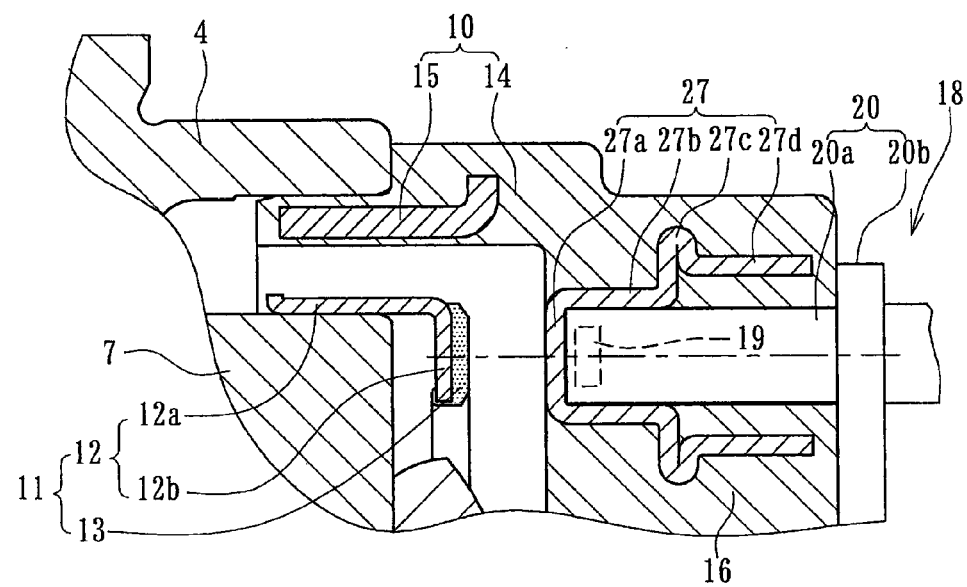
FIG. 5 is a partially enlarged view of another modification of FIG. 2.

FIG. 5 shows another modification of that shown in FIG. 2. This modification is basically only different from the first embodiment (FIG. 2) in the configuration of the sensor receptacle. Thus, its detailed description will be omitted and the same reference numerals are used to designate the same structural element.

The axially projected mounting portion 16 is integrally formed with the cap body 14 at a radially outer portion. A bottomed cylindrical sensor receptacle 27 is integrally molded with the mounting portion 16 at a position corresponding to the magnetic encoder 13. The sensor receptacle 27 includes a bottom portion 27a, a first cylindrical portion 27b, an overlap-bent portion 27c and a second bottom cylindrical portion 27d. The bottom portion 27a is adapted to be arranged so that it opposes the magnetic encoder 13 via a predetermined axial gap. The first cylindrical portion 27b, of smaller diameter, axially extends from its bottom portion 27a. The second cylindrical portion 27d, of larger diameter, is continuous with the first cylindrical portion 27b, of smaller diameter, via the overlap-bent portion 27c. The overlap-bent portion 27c extends radially outward from the first cylindrical portion 27b, of smaller diameter. This makes it possible to further firmly secure the sensor receptacle 27 to the cap body 14.

The sensor receptacle 27 is press-formed from non-magnetic steel sheet e.g. austenitic stainless steel sheet (JIS SUS 304 etc.). Similar to the previously described embodiments, this makes it possible to perform highly accurate speed detection without causing any adverse affect to the rotational speed sensor 19.

Figure 6:
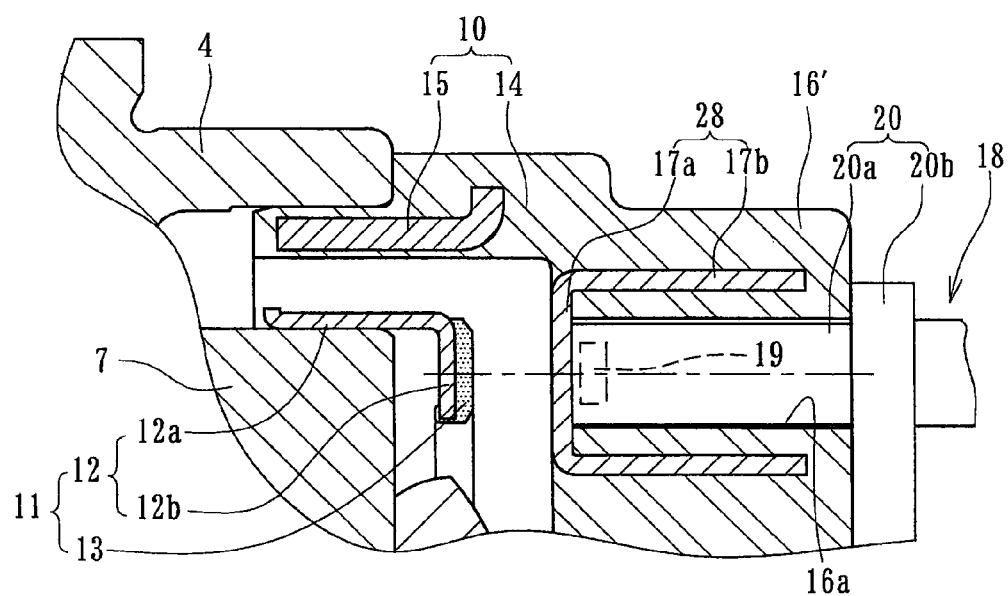
FIG. 6 is a partially enlarged view of another modification of FIG. 2.

FIG. 6 shows another modification of that shown in FIG. 2. This modification is basically only different from the first embodiment (FIG. 2) in the configuration of the sensor receptacle. Thus, its detailed description will be omitted and the same reference numerals are used to designate the same structural element.

An axially projected mounting portion 16' is integrally formed with the cap body 14 at a radially outer portion. A bottomed cylindrical sensor receptacle 28 is integrally molded with the mounting portion 16' at a position corresponding to the magnetic encoder 13. The sensor receptacle 28 is press-formed from austenitic stainless steel sheet (JIS SUS 304 etc.). The sensor receptacle 28 includes the bottom portion 17a adapted to be arranged to oppose the magnetic encoder 13, via a predetermined axial gap. The cylindrical portion 17b axially extends from the bottom portion 17a. In this modification, the cylindrical portion 17b of the sensor receptacle 28 is embedded in the mounting portion 16' without exposure to the outside. Thus, it is possible to increase the contacting area between the mounting portion 16' of the sensor cap 10 and the sensor receptacle 28. This further firmly secures the sensor receptacle 28 relative to the sensor cap 10.

Figure 7:
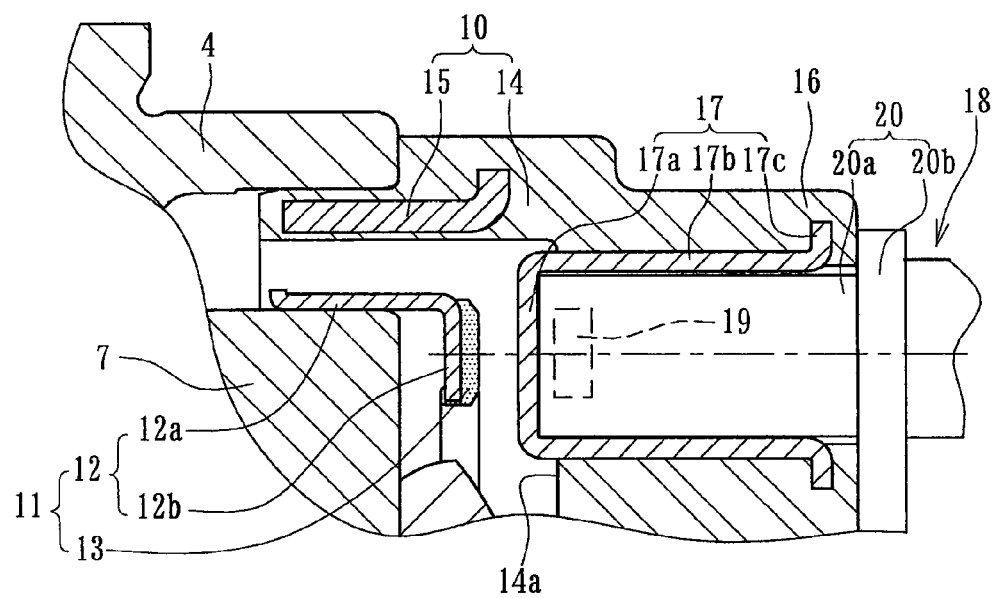
FIG. 7 is a partially enlarged view of a further modification of FIG. 2.

FIG. 7 shows another modification of that shown in FIG. 2. This modification is basically only different from the first embodiment (FIG. 2) in the configuration of the sensor receptacle. Thus its detailed description will be omitted and the same reference numerals are used to designate the same structural element.

An axially projected mounting portion 16 is integrally formed with the cap body 14 at a radially outer portion. A bottomed cylindrical sensor receptacle 17 is integrally molded with the mounting portion 16 at a position corresponding to the magnetic encoder 13. The sensor receptacle 17 is press-formed from austenitic stainless steel sheet (JIS SUS 304 etc.). The sensor receptacle 17 includes the bottom portion 17a adapted to be arranged to oppose the magnetic encoder 13, via a predetermined axial gap. The cylindrical portion 17b axially extends from the bottom portion 17a. A flange portion 17c extends radially outward at the open end of the cylindrical portion 17b. In this modification, the sensor receptacle 17 is molded in the through bore 16a so that the bottom portion 17a of the sensor receptacle 17 projects toward the pulser ring 13 from the bottom surface 14a of the sensor cap 14. This makes it possible to set a desirable axial gap between the pulser ring 13 and the sensor receptacle 17 without any influence of interference between the sensor cap 10 and the wheel bearing 2.

Figure 8:
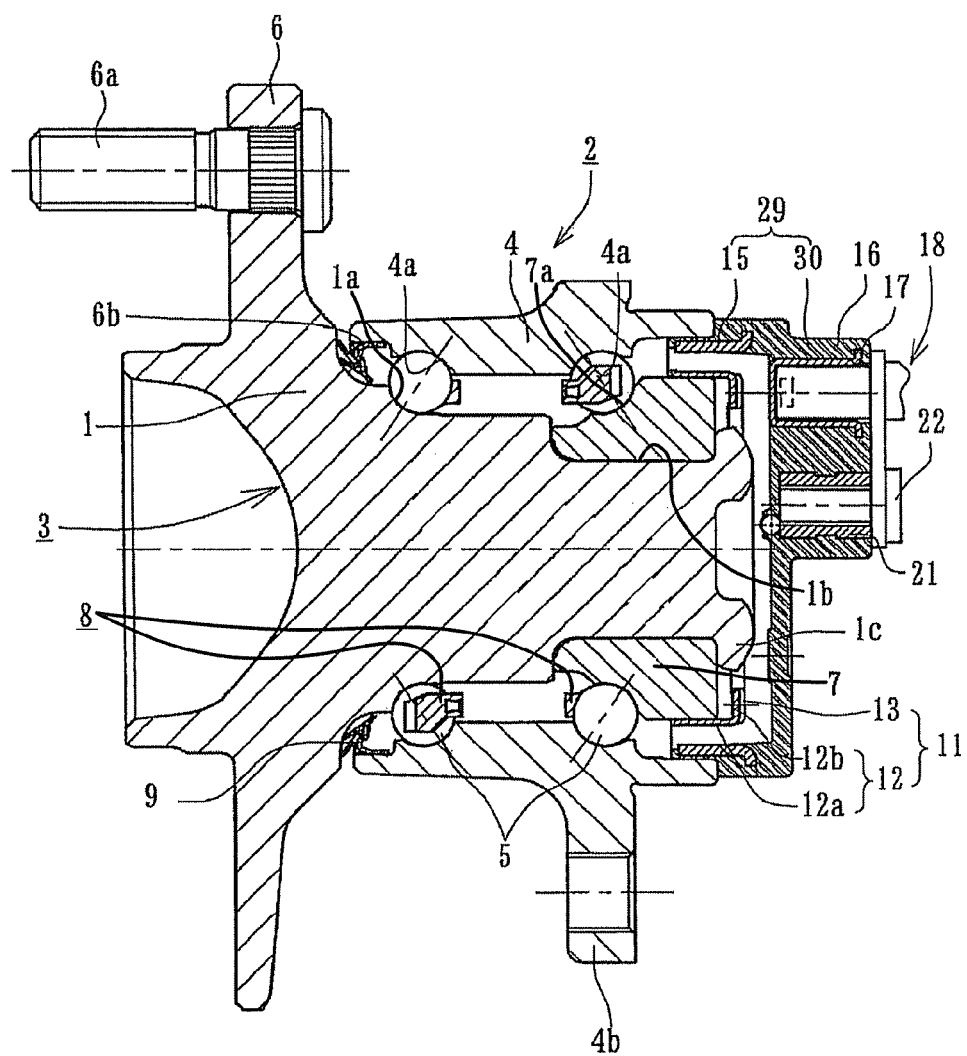
FIG. 8 is a longitudinal-section view of a second embodiment of a wheel bearing apparatus incorporating a rotational speed detecting apparatus.
Figure 9:
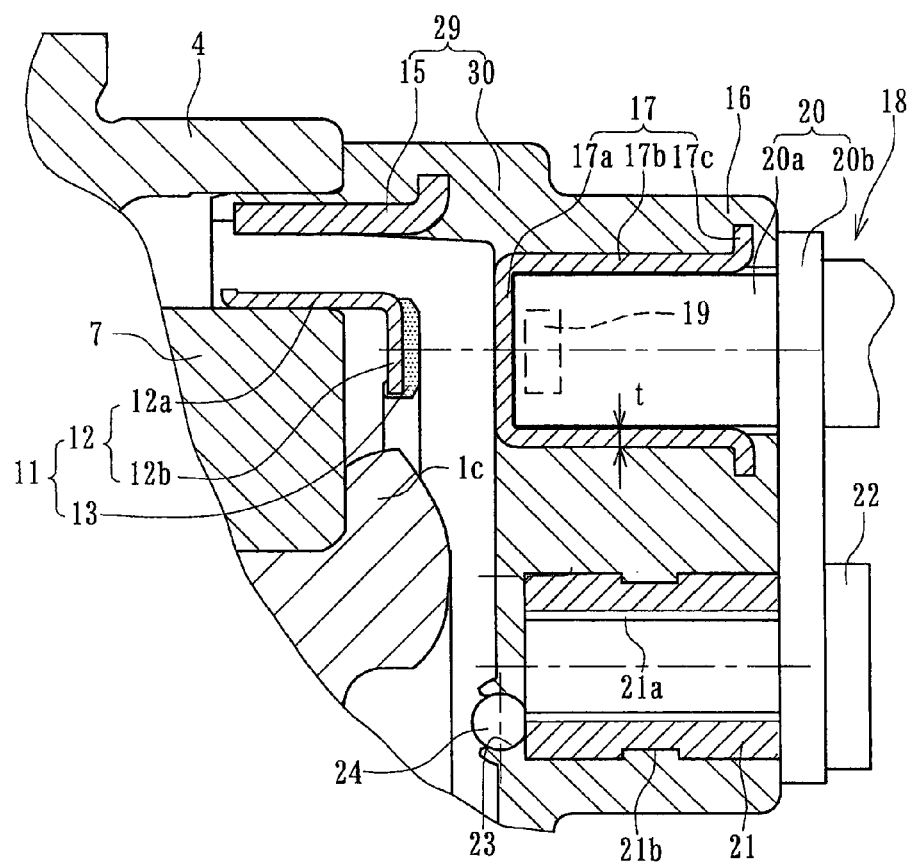
FIG. 9 is a partially enlarged view of FIG. 8.
Figure 10:
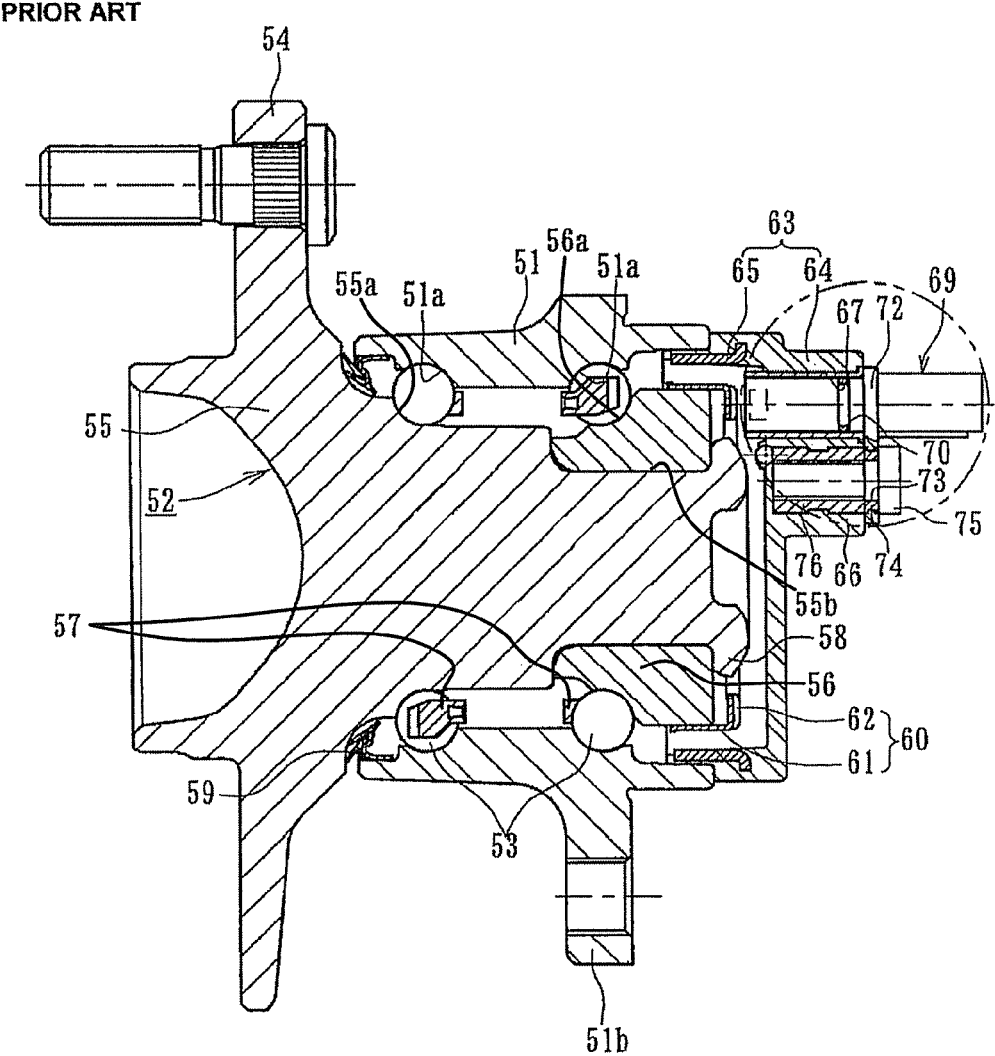
FIG. 10 is a longitudinal-section view of a prior art wheel bearing apparatus incorporating a rotational speed detecting apparatus.
Figure 11:
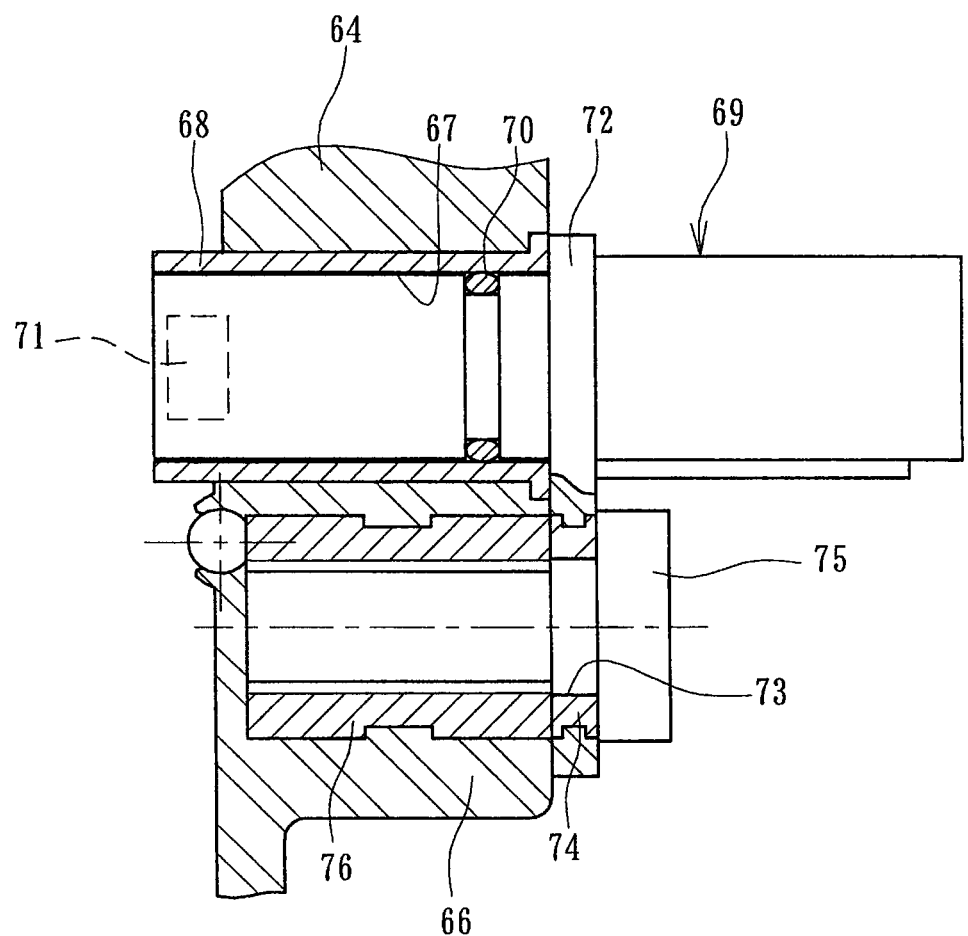
FIG. 11 is a partially enlarged view of FIG. 10.

FIG. 8 is a longitudinal-section view of a second embodiment of a wheel bearing apparatus incorporating a rotational speed detecting apparatus. FIG. 9 is a partially enlarged view of FIG. 8. This embodiment is basically only different from the first embodiment (FIG. 1) in that a sealing member is added to the sensor cap. Thus, the same reference numerals are used to designate the same structural element.

A sensor cap 29 is fit into the inner-side end of the outer member 4 to close the opening of the outer member 4. The sensor cap 29 includes a bottomed cylindrical cap body 30 formed by injection molding of synthetic resin.

As shown in the enlarged view of FIG. 9, a through aperture 23 of small diameter, with a spherical cross-section, is formed in the bottom portion of the cap body 30 at the outer-side end face of the nut 21. A sealing member 24, such as a rubber ball, is press-fit into the through aperture 23 to seal the through aperture 23. In this embodiment, there is no mechanism for communicating the inside of the bearing and the outside other than the through aperture 23. Accordingly, it possible to prevent the leakage of grease sealed within the bearing due to an increase in pressure inside of the bearing. Also, it prevents deformation of the outer-side seal 9 when the sensor cap 29 is fit into the outer member 4. Further, it prevents the entry of rain water etc. into the inside of the wheel bearing from the outside even if a gap is formed in the joining portion between the embedded nut 21, embedded by insert molding, and the mounting portion 16 due to temperature variation during running of the vehicle.

The sealing member 24 is a rubber ball formed, for example, from nitrile rubber, fluoro rubber, acrylic rubber or hydrogenated nitrile rubber. Accordingly, the sealing member 24 can be easily mounted in the simple through aperture 23. In addition, the spherical sealing member 24, with a spherical concave surface, is mounted in the small through aperture 23, via a predetermined interference, and improves sealability.

The present disclosure can be applied to any inner ring rotary type of wheel bearing apparatus incorporating a rotational speed detecting apparatus for a driving wheel, a driven wheel and types using balls or tapered rollers as rolling elements.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A wheel bearing apparatus incorporating a rotational speed detecting apparatus comprising:
an outer member integrally formed with double row outer raceway surfaces on its inner circumference;
an inner member includes a wheel hub and at least one inner ring, the wheel hub is integrally formed on one end with a wheel mounting flange, a cylindrical portion axially extends from the wheel mounting flange, the inner ring is press fit onto the cylindrical portion of the wheel hub, the inner member outer circumference includes double row inner raceway surfaces opposing the double row outer raceway surfaces;
double row rolling elements are contained between the outer raceway surfaces and inner raceway surfaces of the outer member and the inner member;
a pulser ring is adapted to be fit onto the outer circumference of the inner ring and secured to it, the pulser ring has a magnetic characteristic that alternately and equidistantly varies along a circumferential direction;
a bottomed cylindrical sensor cap, formed of synthetic resin by injection molding and having a continuous substantially planar inner surface positioned adjacent to the pulser ring, is fit onto the inner-side end of the outer member;
a mounting portion, formed on the sensor cap, axially projects from the sensor cap at a radially outer position;
a sensor unit is mounted on the mounting portion at a position corresponding to the pulser ring;
a rotational speed sensor, embedded in the sensor unit, is arranged opposite to the pulser ring, via a predetermined axial air gap; and
an axially extending through bore is formed in the mounting portion, a bottomed cylindrical sensor receptacle having a cylindrical wall with an open end and a closed end is integrally molded with the through bore, the sensor receptacle is press-formed from a non-magnetic steel sheet, the closed end of the sensor receptacle is arranged opposite to the pulser ring via a predetermined axial gap, the closed end of the sensor receptacle is positioned in alignment to be substantially flush with the sensor cap planar inner surface and the sensor unit is detachably secured to the sensor receptacle.

2. The wheel bearing apparatus incorporating a rotational speed detecting apparatus of claim 1, wherein the sensor unit has a sensor holder with an integrally formed inserting portion, the rotational speed sensor is embedded in the sensor unit, an integrally formed mounting flange is adapted to be secured to the mounting portion of the sensor cap, a nut is embedded in the mounting portion of the sensor cap by insert molding, and the sensor holder of the sensor unit can be detachably secured to the mounting portion of the sensor cap via a securing bolt.

3. The wheel bearing apparatus incorporating a rotational speed detecting apparatus of claim 2, wherein a through aperture having a spherical cross-section is formed in a bottom portion of the sensor cap at an outer-side end face of the nut and a sealing member is press-fit into the through aperture.

4. The wheel bearing apparatus incorporating a rotational speed detecting apparatus of claim 1, wherein the sensor receptacle is formed with a flange portion that extends radially outward at an open end of a cylindrical portion.

5. The wheel bearing apparatus incorporating a rotational speed detecting apparatus of claim 1, wherein the sensor receptacle is formed with an overlap-bent portion that extends radially outward from a cylindrical portion.

6. The wheel bearing apparatus incorporating a rotational speed detecting apparatus of claim 1, wherein the sensor receptacle has a first cylindrical portion, axially extending from a bottom portion, and a second cylindrical portion which is continuous with the first cylindrical portion via an overlap-bent portion that extends radially outward from the first cylindrical portion.

7. The wheel bearing apparatus incorporating a rotational speed detecting apparatus of claim 1, wherein the mounting portion is formed with the through bore where the sensor unit is mounted, and the cylindrical wall of the sensor receptacle is embedded in the mounting portion without exposure to the outside.

8. The wheel bearing apparatus incorporating a rotational speed detecting apparatus of claim 1, wherein the thickness (t) of a metal sheet forming the sensor receptacle is set within a range of 0.2-1.0 mm.

9. The wheel bearing apparatus incorporating a rotational speed detecting apparatus of claim 1, wherein the sensor cap includes a bottomed cap body and a metal core integrally molded with the cap body at an open end, and the metal core is exposed to the outer circumference of the cap body and is adapted to contact the outer member when the sensor cap is press-fit into the inner circumference of the outer member.

10. The wheel bearing apparatus incorporating a rotational speed detecting apparatus of claim 9, wherein the metal core is press-formed from a non-magnetic steel sheet.

* * * * *

UNITED STATES PATENT AND TRADEMARK OFFICE
CERTIFICATE OF CORRECTION

PATENT NO.        : 8,764,299 B2
APPLICATION NO.   : 13/438860
DATED             : July 1, 2014
INVENTOR(S)       : Akira Torii Page 1 of 1

It is certified that error appears in the above-identified patent and that said Letters Patent is hereby corrected as shown below:

In the Specification

Column 1
Line 22          "scalability" should be --sealability--

Signed and Sealed this
Twenty-fifth Day of November, 2014

Michelle K. Lee
*Deputy Director of the United States Patent and Trademark Office*